(12) United States Patent
Shankar et al.

(10) Patent No.: US 10,635,417 B2
(45) Date of Patent: Apr. 28, 2020

(54) TECHNIQUES FOR COMPILER SHELTERED NON-VOLATILE MEMORY STORES

(71) Applicant: INTEL CORPORATION, Santa Clara, CA (US)

(72) Inventors: Bhanu Shankar, Pleasanton, CA (US); Kshitij Doshi, Tempe, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/006,404

(22) Filed: Jun. 12, 2018

(65) Prior Publication Data

US 2019/0042219 A1 Feb. 7, 2019

(51) Int. Cl.
*G06F 8/41* (2018.01)

(52) U.S. Cl.
CPC .................. *G06F 8/441* (2013.01)

(58) Field of Classification Search
CPC .................................. G06F 8/40–54
USPC .................................. 717/136–161
See application file for complete search history.

(56) References Cited

U.S. PATENT DOCUMENTS

| | | | | |
|---|---|---|---|---|
| 7,971,026 | B2 * | 6/2011 | Nishida | G06F 9/30098 711/203 |
| 8,108,641 | B2 * | 1/2012 | Goss | G06F 12/1408 711/163 |
| 8,856,469 | B2 * | 10/2014 | Jin | G06F 16/2358 711/161 |
| 10,152,247 | B2 * | 12/2018 | Li | G06F 11/1471 |
| 10,163,510 | B1 * | 12/2018 | Giles | G11C 14/0045 |
| 2006/0259744 | A1 * | 11/2006 | Matthes | G06F 15/7867 712/220 |
| 2007/0294496 | A1 * | 12/2007 | Goss | G06F 12/1408 711/163 |
| 2008/0270736 | A1 * | 10/2008 | Nishida | G06F 9/30098 711/203 |
| 2011/0145476 | A1 * | 6/2011 | Hulbert | G06F 12/1009 711/103 |
| 2014/0122845 | A1 * | 5/2014 | Chung | G06F 9/528 712/228 |
| 2016/0342351 | A1 * | 11/2016 | Li | G06F 11/1471 |
| 2018/0046556 | A1 * | 2/2018 | Marathe | G06F 3/0604 |
| 2018/0260324 | A1 * | 9/2018 | Marathe | G06F 16/172 |
| 2019/0129716 | A1 * | 5/2019 | Calciu | G06F 9/3004 |

OTHER PUBLICATIONS

Vernon, R., A Design for Sensing the Boot Type of a Trusted Platform, Naval Postgraduate School, Master's Thesis, Sep. 2005, 68 pages, [retrieved on Jun. 8, 2019], Retrieved from the Internet.*

(Continued)

*Primary Examiner* — Geoffrey R St Leger

(57) ABSTRACT

Various embodiments are generally directed to techniques for compiler sheltered nonvolatile memory (NVM) stores, such as based on demarcated atomic persistence regions in source code, for instance. Some embodiments are particularly related to a compiler that effectively shelters updates to NVM-based variables in a compiler implemented register, or register file, until the compiler has recorded undo values into a temporary but nonvolatile log range.

25 Claims, 11 Drawing Sheets

(56) References Cited

OTHER PUBLICATIONS

Pu, L., et al., Non-intrusive Persistence with a Backend NVM Controller, IEEE Computer Architecture Letters, Jun. 10, 2015, 4 pages, [retrieved on Jun. 11, 2019], Retrieved from the Internet.*
Joshi, A., et al., ATOM: Atomic Durability in Non-volatile Memory through Hardware Logging, IEEE International Symposium on High Performance Computer Architecture (HPCA), Feb. 4-8, 2017, 12 pages, [retrieved on Jun. 7, 2019], Retrieved from the Internet.*
Giles, E., et al., Persisting In-Memory Databases Using SCM, IEEE International Conference on Big Data (Big Data), Dec. 5-8, 2016, pp. 2981-2990, [retrieved on Jun. 6, 2019], Retrieved from the Internet.*

* cited by examiner

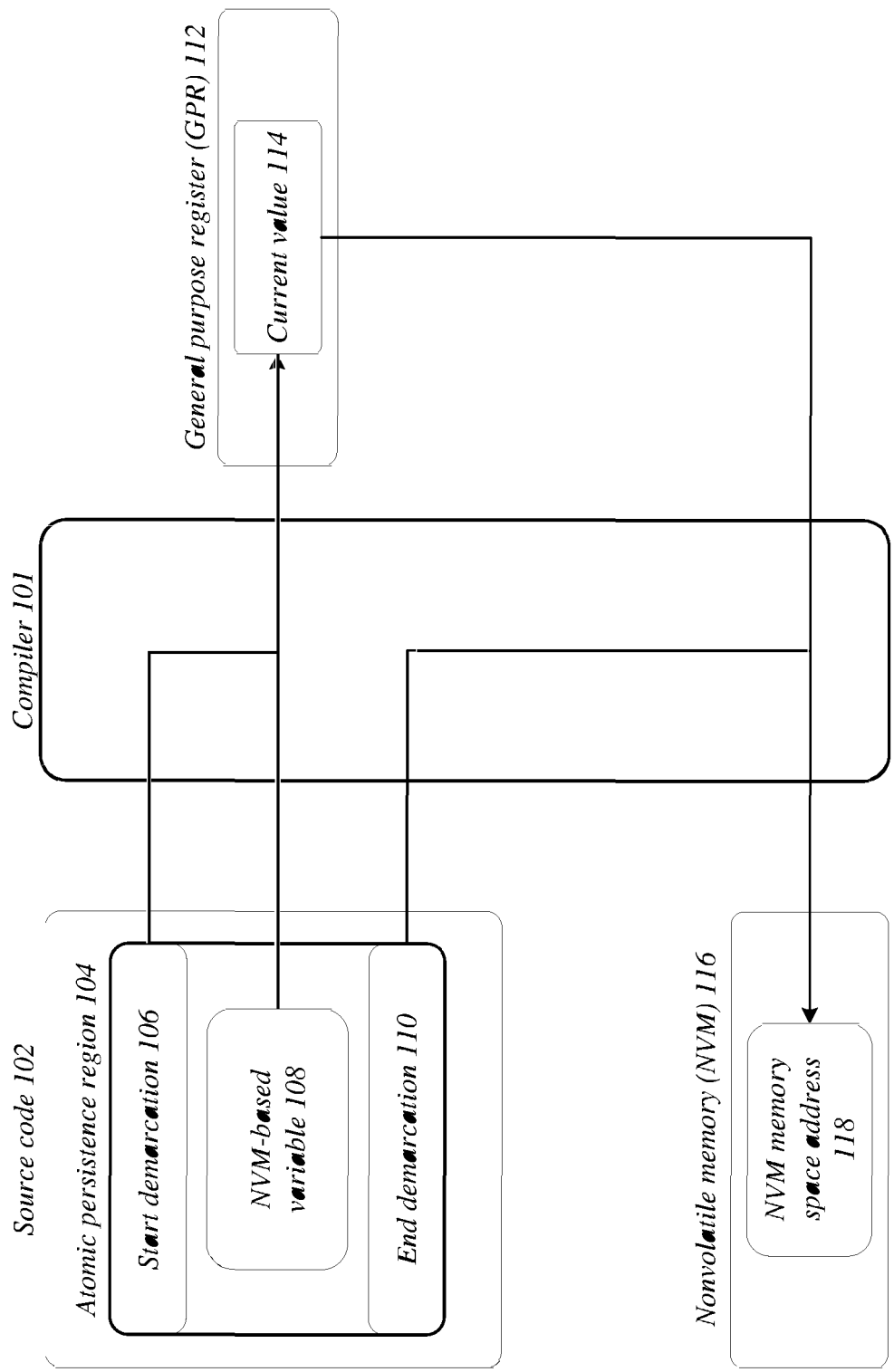

```
1    typedef persistent int pint;
2    typedef persistent double pdouble;
3    ...
4    int tomato_juice (pint int *p, pdouble *q, pint *r) {
5        // p, r point to persistent ints, q to a persistent double
6        ...
7        ...
8        #pragma __PBEGIN__    // - - - - - - - - - - - - - - [X]
9        ...
10       *p = *q + (int) (*r/3.14);  //<-- durable update of *p
11       ...
12       p++;
13       ...
14       *q = sqrt(*r++); *p = 0; //<-- durable update of *q and *p
15       ...
16       if (q <9)
17           p +=4;
18       ...
19       *r = (int)(*q);          // <-- durable update of *r
20       ...
21       #pragma __PEND__      // - - - - - - - - - - - - - - [Y]
22       ...
23       return *p;
24   } // ..................... tomato_juice
```

```
1    typedef persistent int pint;
2    typedef persistent double pdouble;
3    ...
4    int tomato_juice (pint int *p, pdouble *q, pint *r) {
5       // p, r point to persistent ints, q to a persistent double
6       ...
7       ...
8       ...          // <----------#pragma_PBEGIN_
9       ...
10      add_entry_to_undo_log(*p);
11      *p = *q + (int) (*r/3.14); dwb(*p);
12      sfence;      //<-- durable update of *p here
13      prune_undo_log(); // Explicit or implicit
14      ...
15      p++;
16      ...
17      add_entry_to_undo_log(*q);
18      add_entry_to_undo_log(*p);
19
20      *q = sqrt(*r++); *p = 0;
21
22      dwb(*q);
23      dwb(*p);
24      sfence;      //<-- durable update of *q and *p
25      prune_undo_log();
26
27      ...
28      if (q <9)
29         p +=4;
```

```
30      ...
31      add_entry_to_undo_log(*r);
32
33      *r = (int)(*q);
34      clwb(*r);
35      sfence;      // <-- durable update of *r
36      prune_undo_log();
37      ...          // <- - - - - - - - - - #pragma __PEND__
38      ...
39      return *p;
40      } // ..................... tomato_juice
```

```
1    ...
2            int tomato_juice (pint int *p, pdouble *q, pint *r) {
3                // p, r point to persistent ints, q to a persistent double
4                ...
5                ...
6                create_thread_local_undo_log();      // <--- #pragma __PBEGIN__
7                add_entry_to_undo_log(*p);
8                temp1 = *q + (int) (*r/3.14);
9
10               ...
11               temp2 = *p +1;
12               ...
13               add_entry_to_undo_log(*p+1);
14               add_entry_to_undo_log(*q);
15               *temp3 = sqrt(*r++); *temp2 = 0;
16               ...
17               If (q <9)
18                  p +=4;
19               ...
20               add_entry_to_undo_log(*r);
21
22               temp4 = (int)(*q);
23
24               dwb(*r);
25               dwb(*p);
26               dwb(*p+1);
27               dwb(*q);
28               sfence;        // <-- durable update of *r, *p, *p+1, *q
29               reset_thread_local_undo_log();    // <--- #pragma __PEND__
30               ...
31           return *p;
32     } // ..................... tomato_juice
```

*FIG. 7*

Storage Medium 700

Computer Executable Instructions for 600

TECHNIQUES FOR COMPILER SHELTERED NON-VOLATILE MEMORY STORES

BACKGROUND

Generally, a compiler is computer software that transforms computer code written in a first programming language into a second programming language. The first programming language is usually referred to as the source language and the second programming language is usually referred to as the target language. Typically, a compiler is used to translate a source code from a high-level programming language to a lower level language, such as assembly language, object code, or machine code, to create an executable program. For instance, source code may be converted into a program that may be executed on a computer by a compiler.

BRIEF DESCRIPTION OF THE DRAWINGS

FIG. 1 illustrates an exemplary operating environment for compiler sheltered nonvolatile memory stores according to one or more embodiments described herein.

FIG. 3 illustrates exemplary compiler input code with a demarcated atomic persistence region according to one or more embodiments described herein.

FIGS. 4A and 4B illustrate a first example of compiler output code according to one or more embodiments described herein.

FIG. 5 illustrates a second example of compiler output code according to one or more embodiments described herein.

FIG. 7 illustrates an embodiment of a storage medium.

DETAILED DESCRIPTION

Figure 2A:
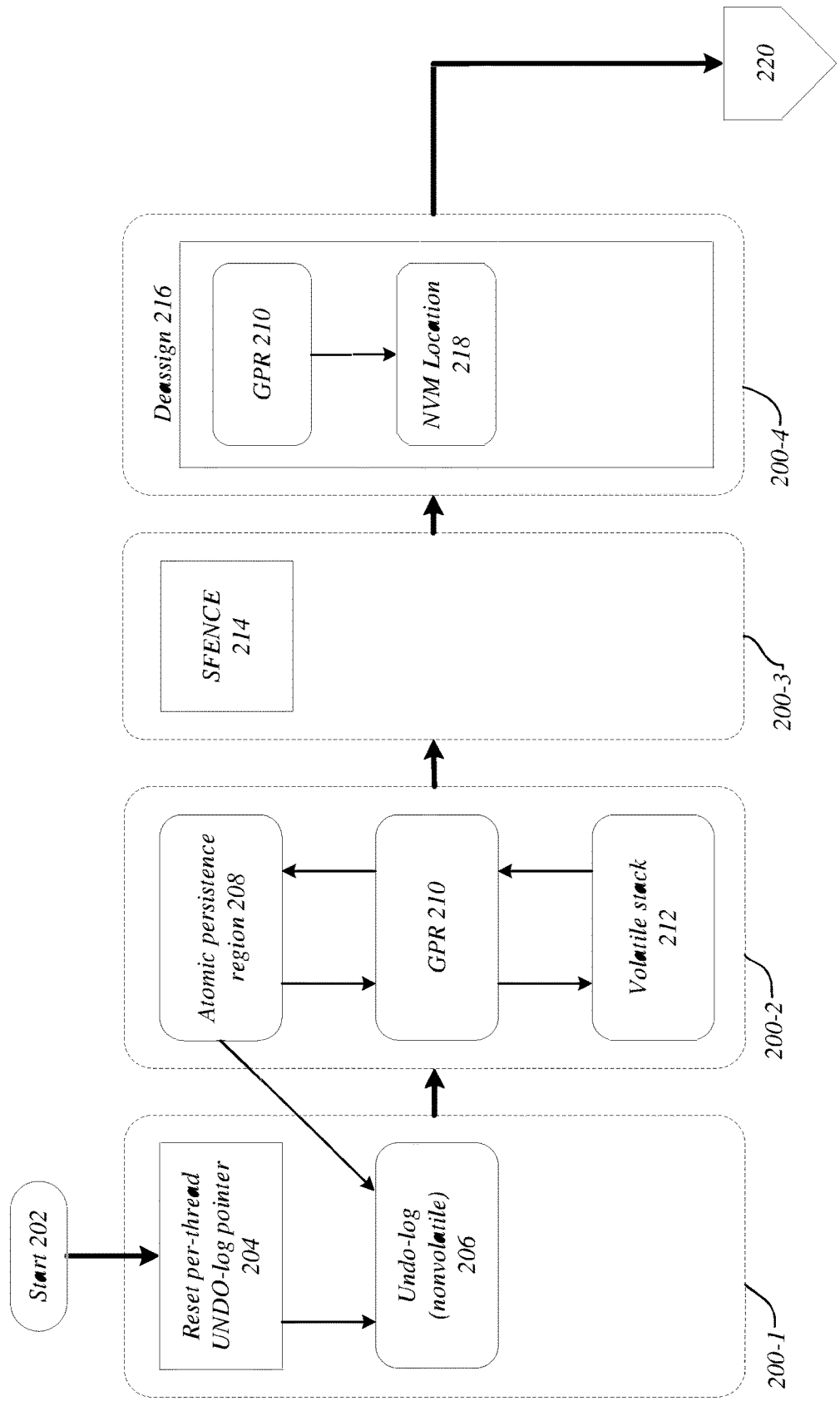
FIGS. 2A and 2B illustrate an exemplary processing flow for compiler sheltered nonvolatile memory stores according to one or more embodiments described herein.

Various embodiments are generally directed to techniques for compiler sheltered nonvolatile memory (NVM) stores, such as based on demarcated atomic persistence regions in source code, for instance. Some embodiments are particularly related to a compiler that effectively shelters updates to NVM-based variables in a compiler implemented register, or register file, until the compiler has recorded undo values into a temporary but nonvolatile log range. In one embodiment, for example, an apparatus may comprise a memory and logic, at least a portion of the logic implemented in circuitry coupled to the memory. In various embodiments, the logic may detect a start of an atomic persistence region in a source code. In various such embodiments, the logic may identify a NVM-based variable in the atomic persistence region of the source code. In some embodiments, the logic may allocate a general purpose register (GPR) to the NVM-based variable. In some such embodiments, the logic may maintain a current value of the NVM-based variable in the GPR. In several embodiments, the logic may detect an end of the atomic persistence region in the source code. In several such embodiments, the logic may store the current value of the NVM-based variable from the GPR to a NVM memory space address associated with the NVM-based variable based on detection of the end of the atomic persistence region. These and other embodiments are described and claimed.

Some challenges facing compilers/designers include the inability to account for or adapt to atomic persistence regions. These challenges may result from the need of designers/programmers to use numerous and/or tedious prescriptive algorithms, library calls, locks, undo logging, or maintaining alias tables for in-memory operations in NVM, use extensive fencing, and/or implement undo/redo logging and log management. In some such instances, the programmer may have to evolve the algorithms as newer hardware makes new capabilities available or if there is a minor change in the way isolation is handled. In some embodiments, a designer may have to convert prescriptive algorithms into code by implementing a prescription for how to redesign software, such as with new locks, management of transactions, and/or abort conditions. Further, the use of a library may offer transactional persistence idioms; however, many developers may not have the flexibility, or the performance budget, to structure their algorithms to apply those idioms—as checkpointing program state is expensive and which-and-how-many locations will be updated in a piece of branchy code is not always known in advance (i.e., at compile time).

Adding further complexity, existing code, applications, programs, and/or hardware can require extensive restructuring and/or redesign. For example, an application may need to be restructured into a pattern similar to that of database management software to make use of a log manager. Redesigning hardware can be a complex and multi-year effort, particularly when it requires rethinking the CPU-cache-memory interactions in which evictions are buffered somewhere before they can be allowed to flow into NVM. Redesigning software is also a difficult proposition, particularly for applications in which many different modules operate on shared data directly through load store (as opposed to object grained get/put operations) instructions that treat memory as one flat array of addressable locations from anywhere in a program. Still further, maintenance of persistent data in an algorithm requires the programmer to have an intimate knowledge of program flow throughout the life of the program. Accordingly, when the original author is no longer available, the maintainers may utilize overly conservative fencing and/or introduce hard to find bugs in the data flow. These and other factors may result in applications with poor efficiency and limited capabilities. Such limitations can reduce performance of an applications, contributing to inflexible systems with limited applicability.

Various embodiments described herein include low level (e.g., compiler) techniques for simplifying atomic persistence for in-memory operations in NVM, such as without complicating general application software with intrusive undo/redo logging and log management. Many embodiments may reorder stores into NVM so that undo logs enter persistence ahead of the stores into NVM. Several embodiments may include a compiler that, under suitable compiler directives, implements an unbounded volatile register space to defer all updates to NVM during a demarcated section of code. In some embodiments, the updates may be logged into durability first, and then the deferred values can be released for lazy writebacks to NVM. In many embodiments, the compiler may be aware of the intent of the programmer as expressed in a high-level language (e.g., via compiler directives and/or demarcations). In many such embodiments, the compiler can implement this type of transient aliasing in an inexpensive way through the artifact of a compiler implemented elastic volatile register file. In several embodiments, the compiler may be the fulcrum for atomic persistence. In various embodiments, the issue of a hardware glass-jaw, terms as 'write lockout' within atomic persistence regions may be substantially reduced. Write-lockout can be a phenomenon caused by multiple writes to the same persistence location, and adjacent persistence locations within a NVM block (or page) before the write is committed to persistent memory. In some embodiments, the need for hardware and/or software redesign may be reduced or eliminated. In many embodiments, these and other features described herein may give developers a broadly applicable and high-performance means, and the flexibility, of targeting both volatile and nonvolatile memory with the same code base, separating persistence concerns from core application logic. In these and other ways, the systems, devices, and techniques described herein may enable reliable and efficient incorporation of atomic persistence regions in code to achieve improved performance and increased adaptability of applications, resulting in several technical effects and advantages.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 for compiler sheltered nonvolatile memory (NVM) stores according to one or more embodiments described herein. Operating environment 100 may include compiler 101, source code 102, general purpose register (GPR) 112, and nonvolatile memory (NVM) 116. In one or more embodiments described herein, compiler 101 may reorder stores to NVM 116 of a NVM-based variable 108 within an atomic persistence region 104 indicated by a start demarcation 106 and an end demarcation 110 using GPR 112. In several embodiments, compiler 101 may lift the burden of a programmer having to do variable by variable tracking of undo-logging such that the variables are written to NVM 116 only after each undo-log is committed and sfenced through non-temporal writes. Embodiments are not limited in this context.

In one or more embodiments, compiler 101 may automate sheltering of NVM-based variables by leveraging the compiler's type inference mechanisms, and using the compiler's own namespace to put at least some of the most frequently touched NVM-based variables, that are fully disambiguated at compile time, into registers or into stack locations. In some embodiments, a majority of the burden of getting both correctness and performance for persistence right at the same time is automated by compiler 101. In various embodiments, compiler 101 may use encounter-time mapping techniques for identifying and sheltering store locations (e.g., GPR 112) into which to put and get a succession of new values (e.g., current value 114 of NVM-based variable 108). In many embodiments, compiler 101 may convert source code 102 into executable code. In many such embodiments, compiler 101 may insert/order instructions while converting source code 102 into executable code that enables or accounts for atomic persistence regions. It will be appreciated that inserting/ordering instructions that when executed achieve a desired outcome may be how compiler 101 performs or implements one or more of the functionalities described herein.

In several embodiments, the compiler 101, under suitable compiler directives (e.g., start demarcation 106, end demarcation 110, etc.), may implement an unbounded volatile register space to defer all updates to NVM 116 during a demarcated section of code (e.g. atomic persistence region 104 identified by start demarcation 106 and end demarcation 110). In some embodiments, compiler 101 may include or comprise a parser. In various embodiments, the compiler 101 may be aware, at compile time, of one or more NVM-based variable, such as via variable declarations. In one or more embodiments, compiler 101 may reorder stores into NVM 116 so that undo logs enter persistence ahead of the stores into NVM 116. In one or more such embodiments, GPR 112 may be used to buffer stores into NVM 116 by tracking a current value 114 of the NVM-based variable 108. In some embodiments, updates may be logged into durability first, and then the deferred values can be released for lazy writebacks to NVM 116.

In one or more embodiments, the compiler 101 may detect a start of atomic persistence region 104 and identify one or more NVM-based variables, such as NVM-based variable 108 within the atomic persistence region 104 of the source code 102 to shelter. In some embodiments, the compiler 101 may allocate GPR 112 to one or more of the NVM-based variables in the atomic persistence region 104. In some such embodiments, GPR 112 may comprise a compiler implemented elastic volatile register file. In various embodiments, the current value 114 of the NVM-based variable 108 may be maintained in the GPR 112. In one or more embodiments, the current value 114 of the NVM-based variable 108 in the GPR 112 may be stored to a NVM memory space address 118 associated with the NVM-based variable in NVM 116 based in response to detecting the end of the atomic persistence region 104 (e.g., via end demarcation 110). These and other aspects of the disclosure will be described in more detail below, such as with respect to FIGS. 2A and 2B.

In many embodiments, compiler 101 may produce correct and efficient code that takes advantage of the compiler 101 knowing which variables are persistent and which are not. In several embodiments, the compiler 101 may lift the burden from a programmer of having to do variable by variable tracking of undo-logging so that the variables are written only after each of many undo-logs are committed and sfenced through non-temporal writes. For many programmers, manual variable by variable tracking may be exceedingly difficult or impossible. For example, if a programmer were to use a library approach (e.g., Persistent Memory Development Kit (PMDK)), the programmer would have to explicitly write different code for volatile and nonvolatile values being updated and explicitly tell the library at each point that the programmer wants to do an undo-log protected (and fenced) write. Further, this may not be possible since a programmer's decision to place different data in volatile or nonvolatile regions can change over time. Therefore, in many embodiments, compiler 101 or an LLVM pass of the compiler 101 can automate variable tracking. In many such embodiments, this may allow correctness to be achieved quickly while optimization can be performed where they are needed.

In some embodiments, the compiler 101 may generate alerts to draw a programmer's attention to bracketed sequences where the compiler 101 is forced to make conservative decisions for sheltering. In some such embodiments, the programmer may be able to tell the compiler 101 (e.g., via a user interface) which variable are immutable even if their identities are unknown—a type of load/store disambiguation over NVM variables. In various embodiments, the compiler 101 may produce code from source code 102 that can be profiled. In various such embodiments, the profiled code may be used to determine narrow instances in practice where a programmer may want to hand tune the code or algorithm. Accordingly, one or more embodiments described herein may free a programmer from the minutiae of dealing with persistence. This may allow the programmer to deal with what they know best—which is, usually, implementing an algorithm in the best possible manner.

Figure 2B:
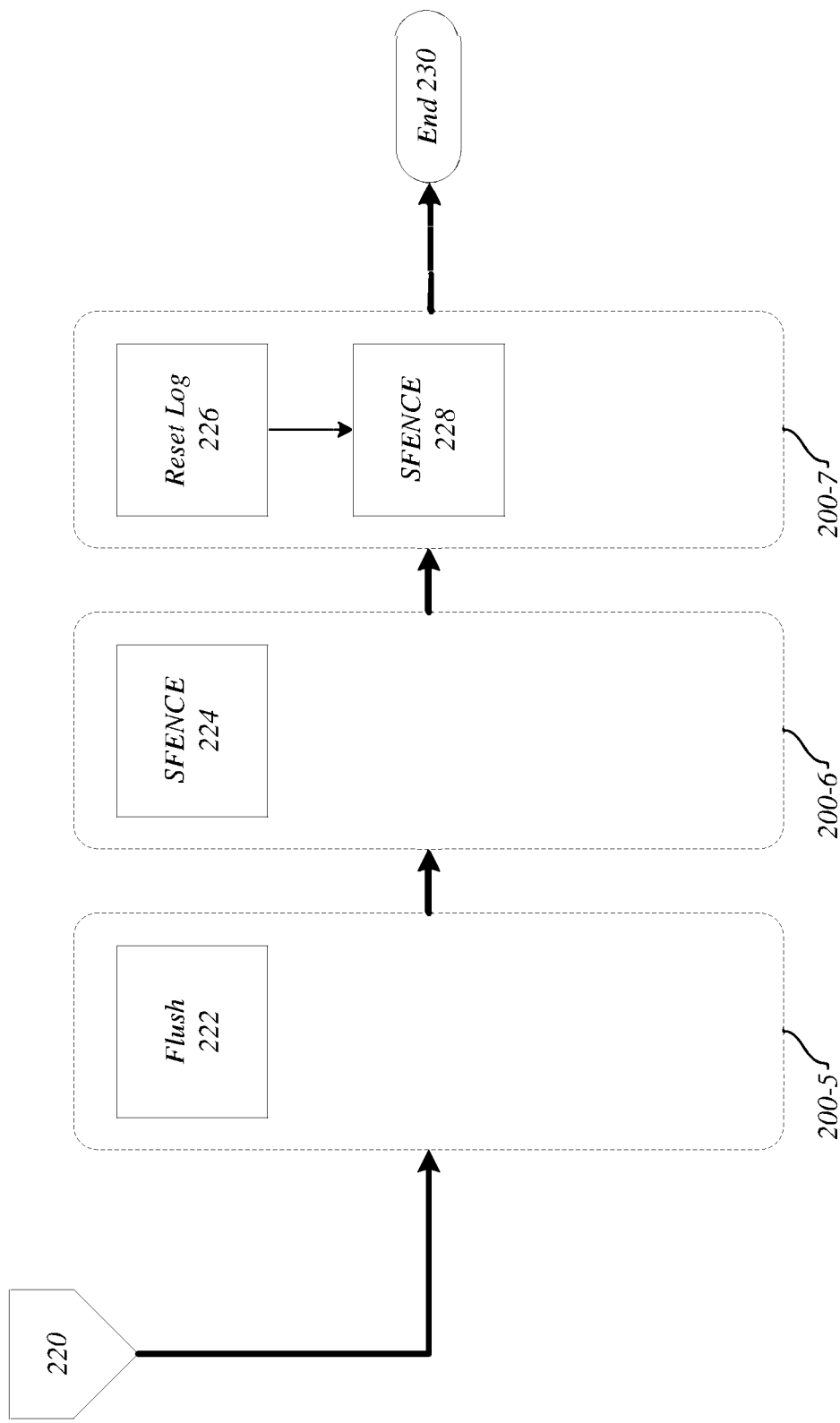

FIGS. 2A and 2B illustrate an exemplary processing flow 200 for compiler sheltered nonvolatile memory stores according to one or more embodiments described herein. Processing flow 200 may begin at start 202, proceed through a number of steps, portions, and/or stages 200-1, 200-2, 200-3, 200-4, 200-5, 200-6, 200-7, and conclude at end 230. In some embodiments, processing flow may be implemented by a compiler, such as by inserting appropriate lines of executable code into source code being compiled. In one or more embodiments described herein, processing flow 200 may effectively shelter updates to NVM-based variables in a compiler implemented and optimized register file until the compiler has recorded the undo values into a temporary but nonvolatile log range. In some embodiments, this log range may be persisted with the overhead of just one SFENCE. In many embodiments, the sheltered updates may be streamed out or write-back-flushed to their home locations (e.g., NVM memory space address 118). Following this, the undo-log may be pruned back to an empty state (since all effects of the atomic persistence region are safely lodged in NVM) for the next reuse. Embodiments are not limited in this context.

In one or more embodiments, a developer may be provided with # pragmas (considered a transaction by the compiler) or other means to mark where an atomic persistence region begins and where it ends (e.g., start demarcation 106 and end demarcation 110). For example, a compiler, or parser, may implement _BEGIN_APR_ and _END_APR_ macros for a programmer to demarcate start and end of an atomic persistence region (APR). In some examples, _BEGIN_APR_/_END_APR_ may be renamed, such as # pragma PBEGIN, # pragma PEND, etc. In many embodiments, the compiler may be informed at compile time which variables are NVM-based. In many such embodiments, an NVM-based variable may refer to a variable whose physical address (i.e., physical memory address) at run-time are to be in NVM. This may be achieved, for instance, by a number of different alternatives, such as type system, template library, type inference, new keywords, macros, pragma/directives, etcetera. It will be appreciated that the ability to know at compile time that a variable is of persistent type does not necessarily mean that the compiler knows at compile time what specific persistent address (e.g., NVM memory space address 118 for NVM-based variable 108) will be associated with the variable. The collections of NVM-based variables may be referred to as being in a set, $\zeta$. $\zeta$ may include variables that are explicitly referenced, as well as those who locations are not known apriori, but are deducible as being in $\zeta$. Accordingly, when compiling statements in an atomic persistence region, for each program variable, $\beta$, at compile time, the compiler can discern whether $\beta$ is volatile ($\beta \notin \zeta$) or is nonvolatile ($\beta \in \zeta$), referred to as NVM $\beta$ or a NVM-based variable.

At the start of the atomic persistence region, the compiler may reset the undo log pointer 204 if needed, as shown in stage 200-1. During the atomic persistence region 208, the compiler mechanically updates the undo log as described in more detail below and shown in stage 200-2. In some embodiments, the compiler may assign GPRs 210 backed by a volatile stack 212 (for spilling/filling the registers), for holding the NVM-based variables. In some such embodiments, the GPRs may not be machine registers, but virtual GPRs that the compiler schedules over actual machine GPRs, such as a RAX register. When the compiler needs to update any NVM-based variable, NVM $\beta$, in the atomic persistence region, it may perform one or more of the following. The compiler may update NVM $\beta$ in its GPR based volatile instance (without writing to NVM $\beta$'s memory space address). The compiler may write an undo-log entry and proceed to flush the undo-long entry if it is the first update of NVM $\beta$, as illustrated with the arrow connecting atomic persistence region 208 and Undo-log 206. In some embodiments, the compiler may alternatively do a non-temporal write (e.g., MOVNT) for this to reduce cache pollution. In various embodiments, the compiler may use a per-thread NVM based buffer to hold the undo-log it creates. In various such embodiments, the buffer may not need to be large because the per-thread undo-log is not large. In several embodiments, the buffer may be dynamically and/or selectively sized and/or statically allocated through a compiler _init_stub.

In many embodiments, when the atomic persistence region ends, the compiler may perform one or more of the following. It may insert or implement an SFENCE 214 (to order following the UNDO), as shown in stage 200-3. Next, the compiler may deassign the GPR. In other words, the compiler may stream out the stores (e.g., current value 110) in GPR 210 to one or more NVM locations 218 (e.g., NVM memory space address 118). In some embodiments, such as if MOVNT is not supported, the compiler may also flush 222 the values from caches, as shown in stage 200-5. In various embodiments, streaming and/or flushing the updates into NVM may be followed with an SFENCE 224. In various such embodiments, this may ensure all the NVM-based variable are safe from loss before continuing. Following this, the per-thread NVM based undo-log buffer may be reset 226 and become reusable for the next atomic persistence region, as shown in stage 200-7. In one or more embodiments, this may be followed by another SFENCE 228. The processing flow 200 may then conclude at end 230.

In these and other embodiments described herein, the compiler may be effectively sheltering the updates (e.g. to NVM-based variables) to associated NVM memory space addresses in a compiler implemented and optimized register file (e.g., in the GPR) until the compiler has recorded the undo values into a temporary but non-volatile log range (e.g., Undo-log 206). In several embodiments, this log range is persisted with the overhead of just one SFENCE. The sheltered updates may then be streamed out or write-back-flushed to their home locations (e.g., NVM memory space address 118) and confirmed in NVM (e.g., NVM 116) with another SFENCE. Following this, the Undo-log may be pruned back to an empty state (since all effects of the atomic persistence region are safely lodged in NVM) for the next reuse.

In many embodiments, the compiler may be the most apt entity to know which variable has how many accesses, and thus it can optimize the allocation of machine registers to the virtual GPRs it implements (so it may minimize the number of spills and fills). In some embodiments the spills and fills may happen in the volatile (cacheable) space during the atomic persistence region—as may the loads and stores. Therefore, in various embodiments, the compiler may hide, or shelter, these updates from getting arbitrarily leaked to NVM—until the Undo-log is safe; and then it actively flushes out all the buffered updates from the volatile GPR file onto NVM home locations. In various such embodiments, once that completes, the cover of the Undo-log can be taken back (i.e., the log pruned off). With these features/techniques, if the programmer has any exception that requires the programmer to abort out of the atomic persistence region, nothing of substance needs to be done—the Undo-log may simply be pruned back and the virtual GPR file may be pruned back as well, without having to do anything to NVM space. Thus, checkpointing may be readily achieved.

One or more of the techniques described herein may work across context switches, and may trivially deal correctly with exceptions (e.g., throws). In several embodiments, dedicating GPRs (backed by the stack) for all stores to NVM variables can cause multiple stores to the same variable to become trivial, as there may be no need to recover original values in case the atomic persistence operation become interrupted, and thus there may be no need to maintain any cursors in the log (nor fence them individually) in order to recover from updates that need to be abrogated. In some embodiments, this may achieve the durable equivalent of structured coding techniques (e.g., elegant handling of exceptions, and transparent undo logging at flexible (programmer demarcated) boundaries.

In various embodiments described herein, one or more techniques described herein may remove the need to flush and update undo log writes individually and to fence each in-place store to NVM home locations before continuing. As the only reason to have concern regarding recovering from an undo log may be if a crash occurs just after the undo log is durably committed and the variables have not yet completely spilled by the compiler in one streaming scatter operation, only one undo log can suffice per thread (atomic persistence regions are expected to not span threads) and the undo log may be pruned immediately after the single SFENCE once the variables have been streamed into the NVM locations.

In many embodiments, one or more of the techniques described herein may amortize SFENCES down to just one for committing new values to NVM before resetting the durable undo log. In many such embodiments, the need for SFENCES may be further reduced by making a torn log recognizable, such as by using sentinel bits. The other SFENCES illustrated in FIGS. 2A and 2B may be optimized away by amortizing sheltering across multiple groups (similar to inlining). Further, one or more techniques described herein may reduce the burden on a programmer to just that of demarcating the persistent regions and letting the compiler and its static runtime automate the rest. For instance, the programmer may not have to perform any ordering within the demarcated region since all stores can flow into the GPR (e.g., a volatile register file in the GPR) in any order the compiler sees fit to optimize, since the final order is all-or-nothing. In other words, it either reaches the end of the persistence region or it bails. In some embodiments, the techniques described herein may leverage register allocation capabilities of the compiler. In one or more embodiments, the notion of 'live values' may be reapplied to variables that need to be sheltered during atomic persistence regions.

In many embodiments, the techniques disclosed herein may enable a programmer to avoid the write-lockout glass jaw with little or no additional effort. This may result from the fact that one or more of the proposed techniques may have the effect of collapsing multiple writes to the same variable at its NVM memory address (e.g., NVM memory space address 118) into a single write from the volatile GPR file. For example, if b[ ] and c[ ] are sparse vectors, and A, a NVM-based variable, is used to accumulate a sparse dot product of b[ ] and c[ ], then multiple updates of A result in different terms are added (accumulated) into it (e.g., as current value 114) as shown below.

$A = b1 * c1;$

. . .

$A\mathrel{+}= b2 * c2;$

. . .

$A\mathrel{+}= b3 * c3;$

. . . .

Pursuant the techniques disclosed herein, A would be in a GPR, A's GPR version would do the accumulation, and then the current value of A would be written at the end (see e.g., 200-4 of FIG. 2A). The effect of this write-collapsing may reduce the statistical likelihood of the write-lockout glass jaw applying here. Also, compiler based flushing may be further optimized so the compiler does not perform CLWB operations until after all updates in stage 200-4 have been written to the caches. Accordingly, the program can avoid reading and writing from a range exactly when CLWBs are evicting lines towards the NVM. Further, with these techniques, the programmer does not have to learn the generational performance characteristics of NVM hardware (such as the write lockout described above).

Additionally, or alternatively, the techniques described herein will work when the variables in an atomic persistence region are updated directly or indirectly (e.g., pointer based stores). For example, if a developer has any indirect writes, the compiler may emulate a hash lookup (through the emitted code) to establish the correspondence between addresses and locations they are assigned in the GPR file. In such example, this can prevent the need produce a backing log write for each update. Further, if the backing log writes are optimized using hashing to map indirect pointers back to the variable they already point to. In many embodiments, optimized associative data structures, such as a Cuckoo hash may be used to mitigate the overhead associated with aliasing the sheltered variables (e.g., NVM-based variable 108). In many such embodiments, the low-level mechanics of converting between pointer based memory references and pointer based references to compiler-based virtual GPRs may be changed to enable this technique. In several embodiments, the compiler may use a pre-optimized Cuckoo hash implementation in place of a linearly indexed implementation for a virtual GPR file for sheltering variables in such codes.

Therefore, in various embodiments, the NVM-based variables that are sheltered in the sheltering store locations (e.g., GPR 112) may themselves be pointers or not, the sheltering store treatment for them is not affected by that distinction—NVM-based pointers may be just like all NVM-based variables whose values need to be held back before the undo log is safely in NVM (e.g., NVM 116). In many embodiments, underneath, load-thunks and store-thunks may be used for each assignment that is not resolvable at compile time but which is known to target a persistent memory location (which may be a value or a pointer). In this sense, the sheltering store used by the compiler may not be an array, but instead a dynamically managed hash map for tracking the current values in persistent memory. For example, the Cuckoo hash may be used, which has approximately constant time insert and lookup overhead.

Load-thunks and store-thunks will now be discussed in more detail. Each record in the sheltering store may be a tuple that contains the address of a variable and its new value (e.g., current value 114) which is being sheltered from assignment to its home (NVM) identity (e.g., NVM memory space address 118). These tuples may be in a hash map structure and the hash map itself may be in the sheltering store region (e.g., GPR 112). In many embodiments, when the compiler sees a store—say, L←V, where some location L in NVM is receiving some value V, it may emit a store-thunk; the store-thunk for (L, V) itself may need to call a load-thunk for V if V needs to be computed from NVM based state, and is not known at compile time (i.e., it is not a constant or an explicitly named variable). Thus, in various embodiments, either V is known to the compiler or a load-thunk will produce V at run time; and what the store-thunk may do is to emulate a hashmap_lookup_and_insert on the location parameter L. As for the load-thunk for any atom in a value expression for V, if that atom is an unknown NVM location, then the load-thunk performs a hash map-lookup within that operation if there is no existing entry in the sheltering store and it was not previously written-to because, therefore, a load access to the NVM-home location for the atom may yields its value.

Now to put this in context, a simpler example will be considered in which three variables x, y, z, all declared as NVM-based (persistent) variables are operated on, and take new values (e.g., current value 114 is updated) in the course of a bracketed computation between a begin-demarcation pragma and an end-demarcation pragma. In this example if x, y, and z are all initialized somewhere with values 0, 0, 0. Next, during the bracketed computation, they may take new final values u, v, w; however, x may get various intermediate values tmp1, tmp2, and so on, until at some point it gets its last value u. Then, the first time that x gets a new value (i.e., tmp1) assigned to it, there may be a store-thunk (x, tmp1) emitted by the compiler, and this store-thunk may create a sheltering store record for x in the hash map and put the value tmp1 there. However, if tmp1 itself is known to the compiler as being computed by dereferencing and performing various operations on what is dereferenced from NVM, then those NVM-dereferencing operations themselves would have been represented in the code stream by load-thunks.

As described above, the assignment x←tmp1 may produce run time instructions that transform it to x'←tmp1, where x' is the field within the hash map record for x, in the sheltering store. Subsequent assignments x←tmp2, x←tmp3, etc. just update x' with those values tmp2, tmp3, etc. If at any point, x is the subject of a load operation (i.e., x is an atom in a value expression—and the compiler's type inference provides it with the knowledge that the referred to atom is of type persistent—even if the compiler does not know that it is specifically x that is being loaded), then the hash map based load-thunk will resolve that load against the value of x' that is in the sheltered store. For each first-time store (i.e., the insertion of a new hash map tuple), the compiler may also automatically produce an undo-log thunk which directs the run-time code to produce an undo-log record. In this way, there would be a record in the undo-log area that would be produced at runtime and that would contain the tuple <x, 0>—the old value of x. In this example, the same sequence of thunks would happen for updates to y and z during the bracketed region.

If there is convoluted pointer dereference chain, such as y=**q then basically the compiler's abstract syntax tree would emit thunks for performing this kind of descent level by level, so long as the compiler correctly knows whether each dereference is leading to a pointer to something in NVM or something not in NVM. Thus, if in the above example, the variable, q, is of type "pointing to a pointer-in-volatile-space, which then points to a location in NVM", then the above thunk would be implemented for obtaining q's content directly (since q is a pointer in the non-NVM space) and then whatever is read from there, would be subject to the load-thunk described above.

Optionally, in some embodiments, the compiler, having done the thunking at compile-time, can issue advisory messages back to a developer that wants to optimize out unnecessary complexity. Thus, the developer can be guided towards untangling what can be untangled at compile time. In various embodiments, an optimization may be for the programmer to convert long sequences of pointer dereferences into and out of NVM to stack variables (which are essentially volatile) and then only produce the final write to NVM, in such a compiler-advised code transform. In other words, thunking may not be used if you can just give temporary names to intermediate variables. Further, because this is a compile time technique, one may use this technique to produce code and run and profile that code even without having actual persistent memory (just compile and run against DDR) to find out which variables or code portions are causing excessive amount of unnecessary sheltering, and breakup the bracketed code into sub-brackets. For instance, breaking up big chunks into small chunks may be used, for example, to turn long sequences of TSX transactions into smaller sequences of TSX transactions.

Indeterminate length arrays will now be discussed in more detail. If there is a loop of indeterminate length of the form:
while (p++!=NULL)
*p+=1;
To increment successive locations with a NULL ending array of pointers, the compiler's emission of load and store-thunks may be handled such that undo logs entries may be created for each and every element in this indeterminate array of pointers. In this case, the compiler may have the option to use coarse-grained checkpointing, such as by creating a shadow array with the updated value and then forcing a full-blown copy-on-exit to enforce persistence. In several embodiments, persistence may be a property that is dealt with in a fine-grain manner a-la database transactions or full blown coarse-grain checkpointing that is used to shelter large arrays in high-performance computing (HPC) clusters.

Further, in one or more embodiments, when the compiler detects such code fragments, it may generate an advisory message to the programmer to assert that the loop is "short" or to use the alternative of a coarse-grained check-pointed array. In various embodiments, other compiler optimization techniques, together with appropriate load-store disambiguations provided in source code may also be applied to remove redundant thunks in the code execution path. Still further, in many embodiments, the programmer may make various simple changes in the high-level code either by compiler advisories, or by profiling code that uses the above automatic sheltering technique. For instance, the programmer may break up long brackets into smaller brackets. In such instances, this may also have the benefit of ensuring that the memory allocated for the sheltering store, while not indefinitely large, is sufficient to accommodate code sequences that perform updates to a bounded number of NVM variables. In some embodiments, the sheltering store may be volatile and may also be extended by a compiler thunk with a little additional complexity. In any case, the sheltering store may get freed up after each bracketed sequence, so there is no issue of an indefinite amount of memory needed for it.

FIGS. 3-5 illustrate exemplary code snippets used to explain features and/or techniques disclosed herein. FIG. 3 illustrates an exemplary compiler input code snippet 300 (e.g., source code) with a demarcated atomic persistence region according to one or more embodiments described herein. FIGS. 4A and 4B illustrate a first example of a compiler output code snippet 400 (e.g., executable code) according to one or more embodiments described herein. FIG. 5 illustrates a second example of a compiler output code snippet 500 (e.g., executable code) according to one or more embodiments described herein. Embodiments are not limited in this context.

Referring to code snippet 300 of FIG. 3, variables that are located in persistent memory are updated in place as shown in lines 10, 14, and 19. In various embodiments, the fact that a variable is in NVM may be indicated by the persistent qualifier in its type declaration, as shown in lines 1 and 2. Line 10 may include an atomic, durable update of pointer p (i.e. *p), which points to a persistent integer—as shown in line 5 comments. Line 14 may include an atomic, durable update of pointer q (i.e., *q), which points to a persistent double—as shown in line 5 comments. Line 19 may include an atomic, durable update of pointer r (i.e., *r)—as shown in line 5 comments. In many embodiments, these atomic, durable updates may be scattered among several basic blocks, and the same location in NVM may also be updated more than once.

Also, shown in code snippet 300 are two demarcations, a start demarcation of line 8 and an end demarcation on line 21. In various embodiments, these demarcations may be used, such as by a developer, to indicate that the code between the two demarcations should be treated as atomically persistent: that is, in case of any failure of hardware or power break, it is desired that either all the updates that the code makes between line 8 and line 21 are ensured to be durable, or none of them are allowed to apply. As shown in FIG. 4, in one or more embodiments, the start demarcation may include # pragma _PBEGIN_ and the end demarcation may include # pragma _PEND_ that demarcate to the compiler the north and south boundaries of the atomically persistent region. Further, in some embodiments, the two demarcations may indicate that in case the program encounters an exception whereby their bracket is not fully executed, then again, the partial updates to the variables are not allowed to become durable.

In several embodiments, the durable update of *p, *q, and *r may be performed by inserting CLWB (or CLFLUSH/CLFLUSHOPT) and SFENCE pairs—thus the code snippet 300 may be translated (e.g., by the compiler) into the code snippet 400 of FIGS. 4A and 4B (see e.g., lines 10, 12, 22, 23, 24, 34, and 35). In many embodiments, the introduction of undo-log-tracking (see e.g., lines 10, 13, 17, 18, 25, 31, and 36 of FIGS. 4A and 4B) and CLWB/SFENCE pairs into the stream of execution may have adverse implications on the performance of the program.

In many embodiments, armed with the demarcations and persistent variable declarations in code snippet 300 of FIG. 3, the compiler may perform one or more of the following algorithms and/or optimizations to produce the code snippet 500 of FIG. 5. For any persistent variable, λ, the short-hand pre(λ) may be used to mean the value of λ at the start of the atomic persistence region (i.e., # pragma _PBEGIN_). In some embodiments, the compiler may use register allocation for holding the variables that are in NVM, between the demarcations. In various embodiments, for short atomic persistence regions, the available GPRs may be sufficient. However, in several embodiments, for longer atomic persistence regions, the compiler may spill/fill the GPRs against its stack. Accordingly, in many embodiments, within the atomic persistence region, home locations in persistent memory continue to retain original values, while all modifications are volatile and aggressively cached in GPRs or in stack. In many such embodiments, the stack may be assigned fast pages in a high-bandwidth memory (HBM) or multi-channel dynamic random-access memory (MCDRAM).

In some embodiments, the compiler may create a volatile undo-log for each assignment it comes across where the assignee variable is declared persistent (e.g., *p, *q, and *r reassignments). In several embodiments, the compiler may include logic or built-in code to recognize and avoid making duplicate undo-log entries (i.e., entering the same pre(k) value more than once for each such variable k). In several such embodiments, this may suffer negligible latency as such variables should be read from the cache, and because these are volatile stores (into an undo-log buffer), they are also unfenced stores (whose latency if any is not of consequence unless there is a cache pressure).

In various embodiments, when the compiler reaches the end demarcations (e.g., # pragma _PEND_), it may perform a streaming write of the undo-log from its volatile location, into a predesignated per-thread nonvolatile log area. In various such embodiments, this may be largely non-blocking, except at the very end, where the stream-out of the undo log into the nonvolatile area is complete, the compiler inserts an SFENCE. Following this, in one or more embodiments, the compiler may release all of the durable updates from their register or stack temporaries into NVM (i.e., perform the actual, final spill, with non-temporal or streaming stores), and then add another SFENCE. In some embodiments, such as in alternative to stream stores, the compiler may do normal stores followed by CLWB.

In several embodiments, just before the end demarcation, the state of the NVM-based variable may be unchanged (i.e., all λ values are pre(λ)). In several such embodiments, before any of them change to their final values at the end of the atomic persistence region (e.g., current value 114), the pre(λ) values are also safely lodged in the nonvolatile undo log area; and, just after the end demarcation, the nonvolatile log area may be reclaimed for the next such use as the final values λ, at that point are also safely ensconced in NVM. In some embodiments, if there is any non-local transfer out of the atomic persistence region (e.g., a throw), then again nothing changes in the home locations (e.g., NVM memory space address 118)—thus exceptions may be handled with the same efficiency that is available in ordinary code for non-persistent variables. As previously mentioned, armed with the demarcations and persistent variable declarations in code snippet 300 of FIG. 3, the compiler may perform one or more of the preceding algorithms and/or optimizations to produce the code snippet 500 of FIG. 5.

In various embodiments, the clustering of all the CLWB followed by a single SFENCE instruction, and a single call to prune the undo log buffer provides a considerable performance gain. Semantically, the programmer may control the granularity of the persistence region and the undo log tracking itself becomes cleaner and the implication for exception handling within this region may make the programmer's job easier all of which allows for greater adoption of the compiler and the non-volatile memory easier.

Figure 6:
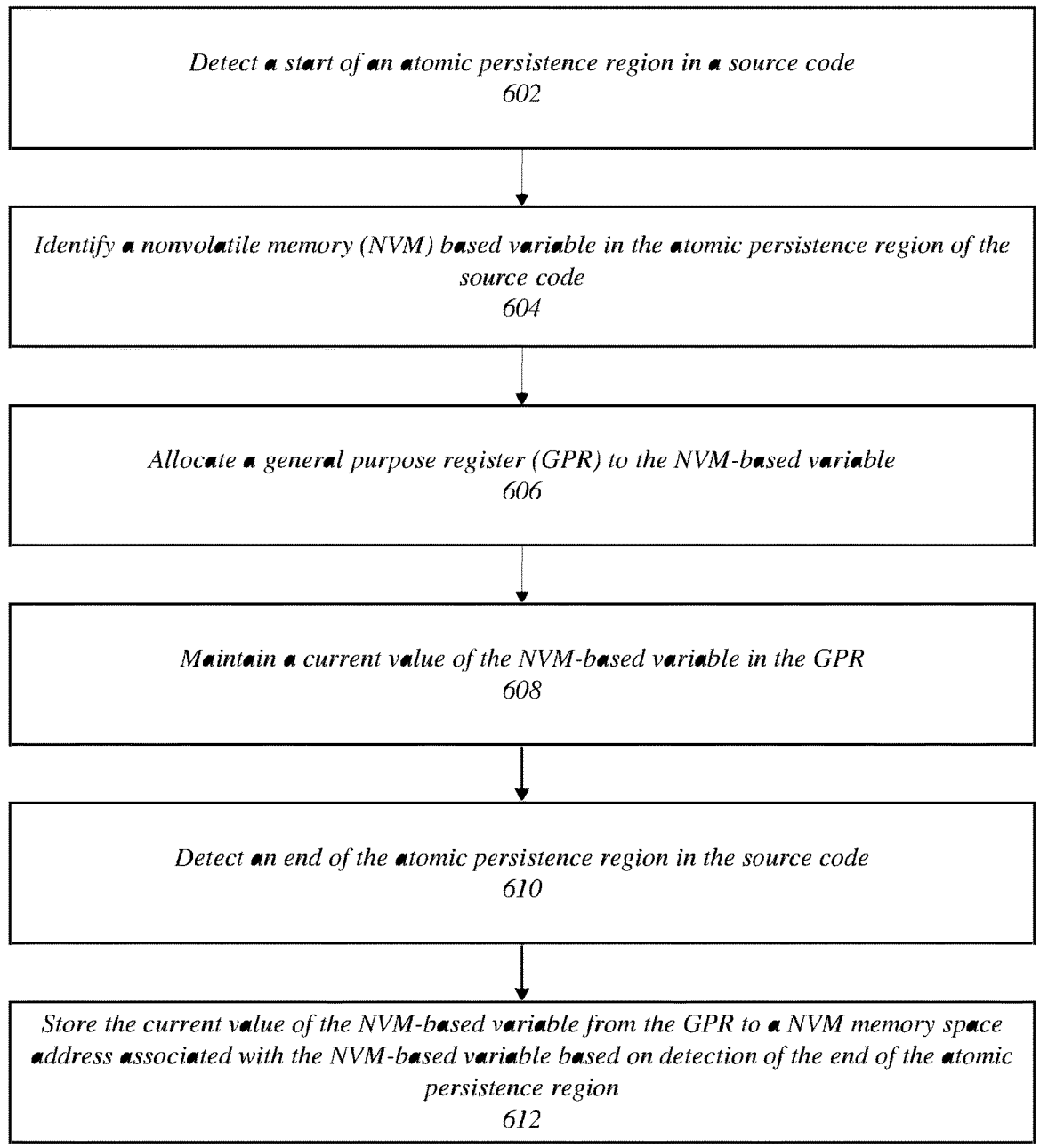
FIG. 6 illustrates an embodiment of a first logic flow.

FIG. 6 illustrates one embodiment of a logic flow 600, which may be representative of operations that may be executed in various embodiments in conjunction with automating and/or optimizing atomic persistence with compiler-sheltered NVM stores. The logic flow 600 may be representative of some or all of the operations that may be executed by one or more components described herein, such as compiler 101. The embodiments are not limited in this context.

In the illustrated embodiments, logic flow 600 may begin at block 602. At block 602 "detect a start of an atomic persistence region in a source code" a start of an atomic persistence region in source code may be detected. For example, the start of atomic persistence region 104 in source code 102 may be detected. In various embodiments, the start of the atomic persistence region 104 may be detected based on start demarcation 106. In various such embodiments, the start of the atomic persistence region 104 may be detected by compiler 101. In one or more embodiments, the start of the atomic persistence region 104 may be detected by compiler 101. Continuing to block 604 "identify a NVM-based variable in the atomic persistence region of the source code" a NVM-based variable may be identified in the atomic persistence region of the source code. For instance, NVM-based variable 108 may be detected within atomic persistence region 104. In some embodiments, the NVM-based variable 108 may be detected within atomic persistence region 104 by compiler 101.

Proceeding to block 606 "allocate a GPR to the NVM-based variable" a GPR may be allocated to the NVM-based variable. For example, GPR 112 may be allocated to the NVM-based variable 108. In many embodiments, GPR 112 may be allocated to the NVM-based variable 108 by compiler 101. Continuing to block 608 "maintain a current value of the NVM-based variable in the GPR" a current value of the NVM-based variable may be maintained in the GPR. For example, a current value 114 of NVM-based variable 108 may be maintained in GPR 112. In several embodiments, the current value 114 of NVM-based variable 108 may be maintained in GPR 112 by compiler 101.

Continuing to block 610 "detect an end of the atomic persistence region in the source code" an end of the atomic persistence region in the source code may be detected. For example, the end of atomic persistence region 104 in source code 102 may be detected. In various embodiments, the end of the atomic persistence region 104 may be detected based on end demarcation 110. In various such embodiments, the end of the atomic persistence region 104 may be detected by compiler 101. Proceeding to block 612 "store the current value of the NVM-based variable from the GPR to a NVM memory space address associated with the NVM-based variable based on detection of the end of the atomic persistence region" the current value of the NVM-based variable may be stored from the GPR to a NVM memory space address associated with the NVM-based variable based on detection of the end of the atomic persistence region. For example, current value 114 of NVM-based variable 108 in GPR 112 may be stored to NVM memory space address 118 of NVM 116 based on the detection of the end of the atomic persistence region 104. In some embodiments, compiler 101 may store the current value 114 of NVM-based variable 108 in GPR 112 to the NVM memory space address 118 of NVM 116 based on the detection of end demarcation 110.

FIG. 7 illustrates an embodiment of a storage medium 700. Storage medium 700 may comprise any non-transitory computer-readable storage medium or machine-readable storage medium, such as an optical, magnetic or semiconductor storage medium. In various embodiments, storage medium 700 may comprise an article of manufacture. In some embodiments, storage medium 700 may store computer-executable instructions, such as computer-executable instructions to implement one or more of logic flows or operations described herein, such as with respect to logic flow 600 of FIG. 6. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 8:
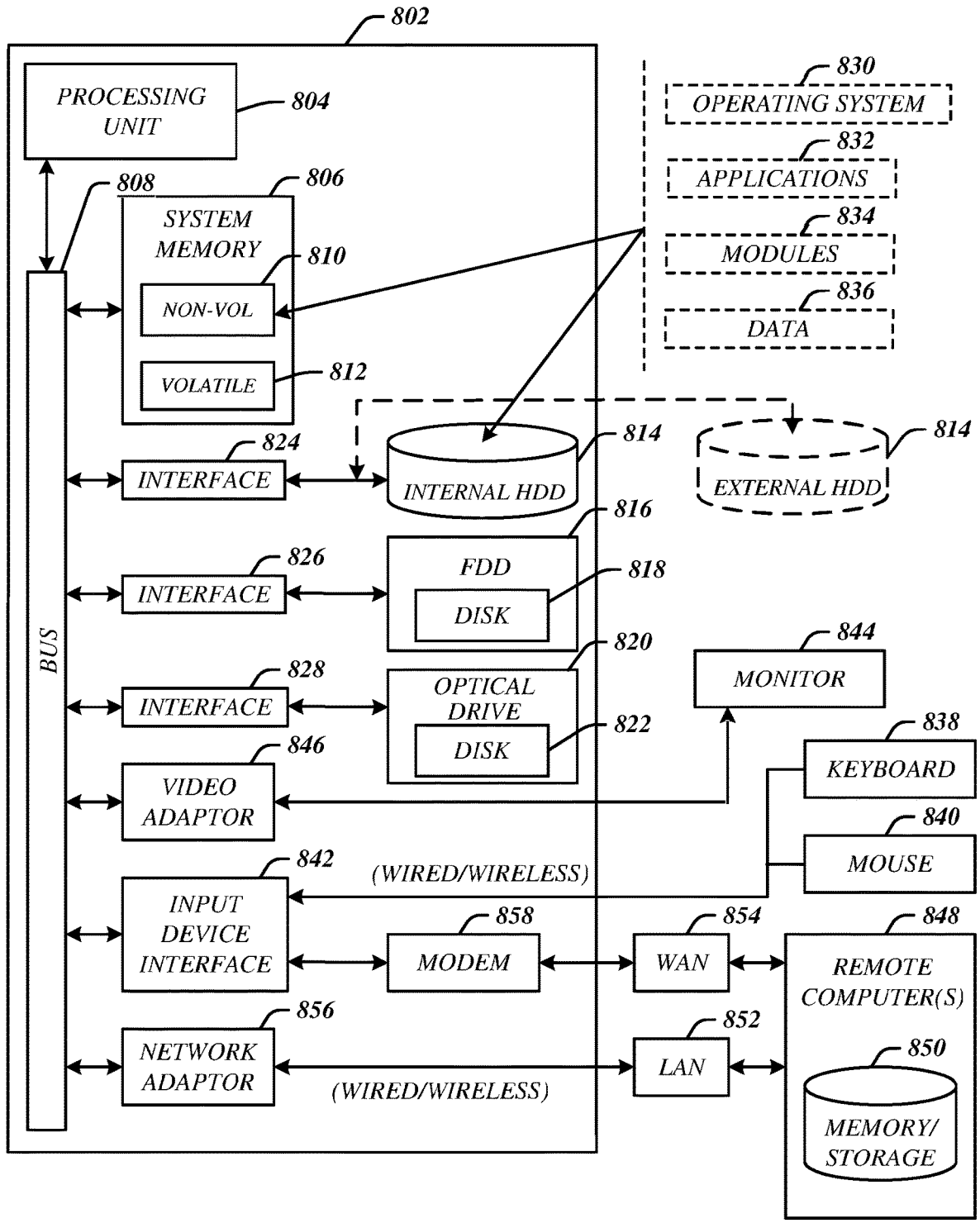
FIG. 8 illustrates an embodiment of a computing architecture.

FIG. 8 illustrates an embodiment of an exemplary computing architecture 800 that may be suitable for implementing various embodiments as previously described. In various embodiments, the computing architecture 800 may comprise or be implemented as part of an electronic device. In some embodiments, the computing architecture 800 may be representative, for example, of a distributed processing system that implements or utilizes one or more components described herein. In some embodiments, computing architecture 800 may be representative, for example, of a compute node in a distributed processing system described herein that implements or utilizes one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. In some embodiments, system memory 806 may include main memory. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and Institute of Electrical and Electronics Engineers (IEEE) 994 interface technologies. In various embodiments, these types of memory may not be included in main memory or system memory.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include or implement, for example, the various techniques, applications, and/or components (e.g., compiler 101) described herein.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 994 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. In various embodiments, one or more migrations may occur via the networked environment. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
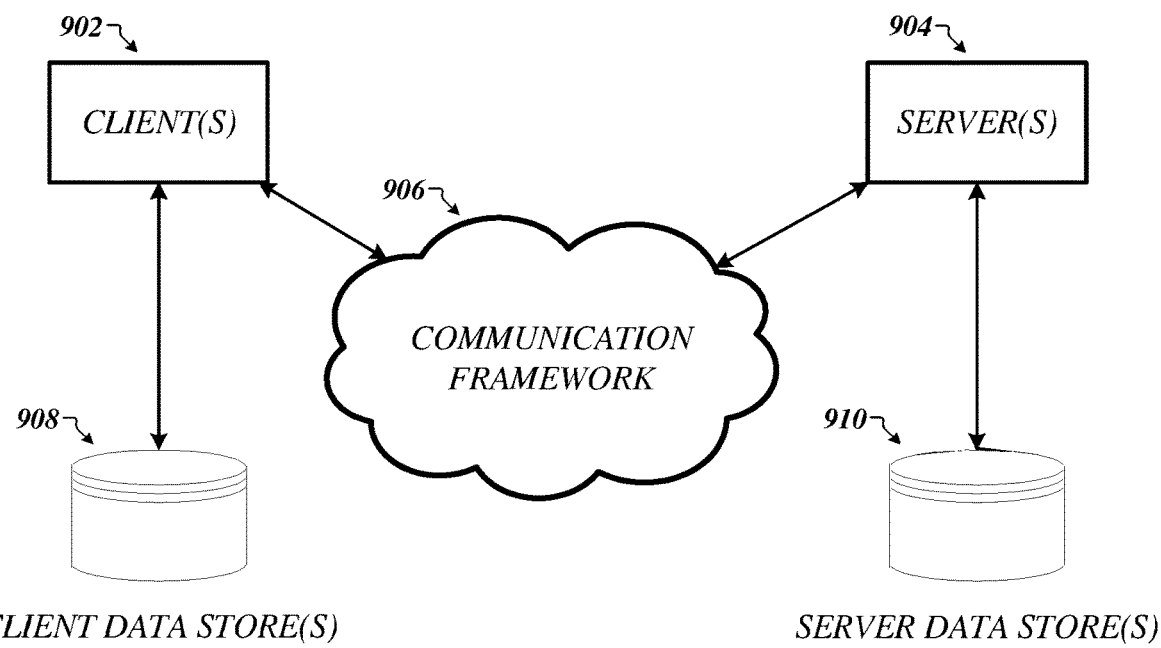
FIG. 9 illustrates an embodiment of a communications architecture.

FIG. 9 illustrates a block diagram of an exemplary communications architecture 900 suitable for implementing various embodiments as previously described, such as virtual machine migration. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments communications architecture may include or implement one or more portions of components, applications, and/or techniques described herein. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described herein, and storage medium 700 of FIG. 7 in conjunction with storage of data received from any one of clients 902 on any of server data stores 910. In one or more embodiments, one or more of client data store(s) 908 or server data store(s) 910 may include memory accessible to one or more portions of components, applications, and/or techniques described herein.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a memory; and logic, at least a portion of the logic implemented in circuitry coupled to the memory, the logic to: detect a start of an atomic persistence region in a source code; identify a nonvolatile memory (NVM) based variable in the atomic persistence region of the source code; allocate a general purpose register (GPR) to the NVM-based variable; maintain a current value of the NVM-based variable in the GPR; detect an end of the atomic persistence region in the source code; and store the current value of the NVM-based variable in the GPR to a NVM memory space address associated with the NVM-based variable based on detection of the end of the atomic persistence region.

Example 2 includes the subject matter of Example 1, the GPR backed by a volatile stack, the volatile stack for filling or spilling the GPR.

Example 3 includes the subject matter of Example 1, the GPR based in volatile memory.

Example 4 includes the subject matter of Example 1, the GPR comprising an elastic volatile register file.

Example 5 includes the subject matter of Example 1, the GPR comprising a virtual GPR, the logic to schedule the virtual GPR over one or more hardware GPRs.

Example 6 includes the subject matter of Example 1, the NVM-based variable comprising a variable with a physical address in NVM at run-time.

Example 7 includes the subject matter of Example 1, the logic to store an updated value of the NVM-based variable in the GPR to maintain the current value of the NVM-based variable in the GPR.

Example 8 includes the subject matter of Example 1, the logic to reset an UNDO-log pointer based on detection of the start of the atomic persistence region in the source code.

Example 9 includes the subject matter of Example 1, the logic to write an UNDO-log entry on a first update of the current value of the NVM-based variable in the GPR.

Example 10 includes the subject matter of Example 9, the logic to write the UNDO-log entry to a NVM-based buffer.

Example 11 includes the subject matter of Example 10, the logic to allocate the size of the NVM-based buffer.

Example 12 includes the subject matter of Example 9, the logic to flush the UNDO-log entry on the first update of the current value of the NVM-based variable in the GPR.

Example 13 includes the subject matter of Example 1, the logic to non-temporally write an UNDO-log entry on a first update of the current value of the NVM-based variable in the GPR.

Example 14 includes the subject matter of Example 1, the logic to store an updated value of the NVM-based variable in the GPR to maintain the current value of the NVM-based variable in the GPR.

Example 15 includes the subject matter of Example 14, the logic to store the updated value of the NVM-based variable in the GPR without a write of the updated value to the NVM memory space address associated with the NVM-based variable prior to detection of the end of the atomic persistence region in the source code.

Example 16 includes the subject matter of Example 1, the logic to execute an SFENCE instruction based on detection of the end of the atomic persistence region in the source code.

Example 17 includes the subject matter of Example 16, the SFENCE instruction to ensure any stores made before the SFENCE instruction are globally visible prior to any stores made after the SFENCE instruction.

Example 18 includes the subject matter of Example 17, the logic to stream or write-back-flush the current value of the NVM-based variable in the GPR to the NVM memory space address associated with the NVM-based variable to store the current value of the NVM-based variable to the NVM memory space address associated with the NVM-based variable in response to execution of the SFENCE instruction.

Example 19 includes the subject matter of Example 18, the logic to flush the current value of the NVM-based variable from one or more caches in response to execution of the SFENCE instruction.

Example 20 includes the subject matter of Example 18, the logic to execute a second SFENCE instruction after the current value of the NVM-based variable in the GPR is streamed or write-back-flushed to the memory address space associated with the NVM.

Example 21 includes the subject matter of Example 20, the logic to prune an UNDO-log to an empty state after execution of the second SFENCE instruction.

Example 22 includes the subject matter of Example 20, the logic to prune the GPR to an empty state after execution of the second SFENCE instruction.

Example 23 is at least one non-transitory computer-readable medium comprising a set of instructions that, in response to being executed by a processor circuit, cause the processor circuit to: detect a start of an atomic persistence region in a source code; identify a nonvolatile memory (NVM) based variable in the atomic persistence region of the source code; allocate a general purpose register (GPR) to the NVM-based variable; maintain a current value of the NVM-based variable in the GPR; detect an end of the atomic persistence region in the source code; and store the current value of the NVM-based variable in the GPR to a NVM memory space address associated with the NVM-based variable based on detection of the end of the atomic persistence region.

Example 24 includes the subject matter of Example 23, the GPR backed by a volatile stack, the volatile stack for filling or spilling the GPR.

Example 25 includes the subject matter of Example 23, the GPR based in volatile memory.

Example 26 includes the subject matter of Example 23, the GPR comprising an elastic volatile register file.

Example 27 includes the subject matter of Example 23, the GPR comprising a virtual GPR, and comprising instructions that, in response to being executed by the processor circuit, cause the processor circuit to schedule the virtual GPR over one or more hardware GPRs.

Example 28 includes the subject matter of Example 23, the NVM-based variable comprising a variable with a physical address in NVM at run-time.

Example 29 includes the subject matter of Example 23, comprising instructions that, in response to being executed by the processor circuit, cause the processor circuit to store an updated value of the NVM-based variable in the GPR to maintain the current value of the NVM-based variable in the GPR.

Example 30 includes the subject matter of Example 23, comprising instructions that, in response to being executed by the processor circuit, cause the processor circuit to reset an UNDO-log pointer based on detection of the start of the atomic persistence region in the source code.

Example 31 includes the subject matter of Example 23, comprising instructions that, in response to being executed by the processor circuit, cause the processor circuit to write an UNDO-log entry on a first update of the current value of the NVM-based variable in the GPR.

Example 32 includes the subject matter of Example 31, comprising instructions that, in response to being executed by the processor circuit, cause the processor circuit to write the UNDO-log entry to a NVM-based buffer.

Example 33 includes the subject matter of Example 32, comprising instructions that, in response to being executed by the processor circuit, cause the processor circuit to allocate the size of the NVM-based buffer.

Example 34 includes the subject matter of Example 31, comprising instructions that, in response to being executed by the processor circuit, cause the processor circuit to flush the UNDO-log entry on the first update of the current value of the NVM-based variable in the GPR.

Example 35 includes the subject matter of Example 23, comprising instructions that, in response to being executed by the processor circuit, cause the processor circuit to non-temporally write an UNDO-log entry on a first update of the current value of the NVM-based variable in the GPR.

Example 36 includes the subject matter of Example 23, comprising instructions that, in response to being executed by the processor circuit, cause the processor circuit to store an updated value of the NVM-based variable in the GPR to maintain the current value of the NVM-based variable in the GPR.

Example 37 includes the subject matter of Example 36, comprising instructions that, in response to being executed by the processor circuit, cause the processor circuit to store the updated value of the NVM-based variable in the GPR without a write of the updated value to the NVM memory space address associated with the NVM-based variable prior to detection of the end of the atomic persistence region in the source code.

Example 38 includes the subject matter of Example 23, comprising instructions that, in response to being executed by the processor circuit, cause the processor circuit to execute an SFENCE instruction based on detection of the end of the atomic persistence region in the source code.

Example 39 includes the subject matter of Example 38, the SFENCE instruction to ensure any stores made before the SFENCE instruction are globally visible prior to any stores made after the SFENCE instruction.

Example 40 includes the subject matter of Example 39, comprising instructions that, in response to being executed by the processor circuit, cause the processor circuit to stream or write-back-flush the current value of the NVM-based variable in the GPR to the NVM memory space address associated with the NVM-based variable to store the current value of the NVM-based variable to the NVM memory space address associated with the NVM-based variable in response to execution of the SFENCE instruction.

Example 41 includes the subject matter of Example 40, comprising instructions that, in response to being executed by the processor circuit, cause the processor circuit to flush the current value of the NVM-based variable from one or more caches in response to execution of the SFENCE instruction.

Example 42 includes the subject matter of Example 40, comprising instructions that, in response to being executed by the processor circuit, cause the processor circuit to execute a second SFENCE instruction after the current value of the NVM-based variable in the GPR is streamed or write-back-flushed to the memory address space associated with the NVM.

Example 43 includes the subject matter of Example 42, comprising instructions that, in response to being executed by the processor circuit, cause the processor circuit to prune an UNDO-log to an empty state after execution of the second SFENCE instruction.

Example 44 includes the subject matter of Example 42, comprising instructions that, in response to being executed by the processor circuit, cause the processor circuit to prune the GPR to an empty state after execution of the second SFENCE instruction.

Example 45 is a computer-implemented method, comprising: detecting a start of an atomic persistence region in a source code; identifying a nonvolatile memory (NVM) based variable in the atomic persistence region of the source code; allocating a general purpose register (GPR) to the NVM-based variable; maintaining a current value of the NVM-based variable in the GPR; detecting an end of the atomic persistence region in the source code; and storing the current value of the NVM-based variable in the GPR to a NVM memory space address associated with the NVM-based variable based on detection of the end of the atomic persistence region.

Example 46 includes the subject matter of Example 45, the GPR backed by a volatile stack, the volatile stack for filling or spilling the GPR.

Example 47 includes the subject matter of Example 45, the GPR based in volatile memory.

Example 48 includes the subject matter of Example 45, the GPR comprising an elastic volatile register file.

Example 49 includes the subject matter of Example 45, the GPR comprising a virtual GPR and comprising scheduling the virtual GPR over one or more hardware GPRs.

Example 50 includes the subject matter of Example 45, the NVM-based variable comprising a variable with a physical address in NVM at run-time.

Example 51 includes the subject matter of Example 45, comprising storing an updated value of the NVM-based variable in the GPR to maintain the current value of the NVM-based variable in the GPR.

Example 52 includes the subject matter of Example 45, comprising resetting an UNDO-log pointer based on detection of the start of the atomic persistence region in the source code.

Example 53 includes the subject matter of Example 45, comprising writing an UNDO-log entry on a first update of the current value of the NVM-based variable in the GPR.

Example 54 includes the subject matter of Example 53, comprising writing the UNDO-log entry to a NVM-based buffer.

Example 55 includes the subject matter of Example 54, comprising allocating the size of the NVM-based buffer.

Example 56 includes the subject matter of Example 53, comprising flushing the UNDO-log entry on the first update of the current value of the NVM-based variable in the GPR.

Example 57 includes the subject matter of Example 45, comprising non-temporally writing an UNDO-log entry on a first update of the current value of the NVM-based variable in the GPR.

Example 58 includes the subject matter of Example 45, comprising storing an updated value of the NVM-based variable in the GPR to maintain the current value of the NVM-based variable in the GPR.

Example 59 includes the subject matter of Example 58, comprising storing the updated value of the NVM-based variable in the GPR without a write of the updated value to the NVM memory space address associated with the NVM-based variable prior to detection of the end of the atomic persistence region in the source code.

Example 60 includes the subject matter of Example 45, comprising executing an SFENCE instruction based on detection of the end of the atomic persistence region in the source code.

Example 61 includes the subject matter of Example 60, the SFENCE instruction to ensure any stores made before the SFENCE instruction are globally visible prior to any stores made after the SFENCE instruction.

Example 62 includes the subject matter of Example 61, comprising streaming or write-back-flushing the current value of the NVM-based variable in the GPR to the NVM memory space address associated with the NVM-based variable to store the current value of the NVM-based variable to the NVM memory space address associated with the NVM-based variable in response to execution of the SFENCE instruction.

Example 63 includes the subject matter of Example 62, comprising flushing the current value of the NVM-based variable from one or more caches in response to execution of the SFENCE instruction.

Example 64 includes the subject matter of Example 62, comprising executing a second SFENCE instruction after the current value of the NVM-based variable in the GPR is streamed or write-back-flushed to the memory address space associated with the NVM.

Example 65 includes the subject matter of Example 64, comprising pruning an UNDO-log to an empty state after execution of the second SFENCE instruction.

Example 66 includes the subject matter of Example 64, comprising pruning the GPR to an empty state after execution of the second SFENCE instruction.

Example 67 is an apparatus, comprising: means for detecting a start of an atomic persistence region in a source code; means for identifying a nonvolatile memory (NVM) based variable in the atomic persistence region of the source code; means for allocating a general purpose register (GPR) to the NVM-based variable; means for maintaining a current value of the NVM-based variable in the GPR; means for detecting an end of the atomic persistence region in the source code; and means for storing the current value of the NVM-based variable in the GPR to a NVM memory space address associated with the NVM-based variable based on detection of the end of the atomic persistence region.

Example 68 includes the subject matter of Example 67, the GPR backed by a volatile stack, the volatile stack comprising means for filling or spilling the GPR.

Example 69 includes the subject matter of Example 67, the GPR based in volatile memory.

Example 70 includes the subject matter of Example 67, the GPR comprising an elastic volatile register file.

Example 71 includes the subject matter of Example 67, the GPR comprising a virtual GPR and comprising means for scheduling the virtual GPR over one or more hardware GPRs.

Example 72 includes the subject matter of Example 67, the NVM-based variable comprising a variable with a physical address in NVM at run-time.

Example 73 includes the subject matter of Example 67, comprising means for storing an updated value of the NVM-based variable in the GPR to maintain the current value of the NVM-based variable in the GPR.

Example 74 includes the subject matter of Example 67, comprising means for resetting an UNDO-log pointer based on detection of the start of the atomic persistence region in the source code.

Example 75 includes the subject matter of Example 67, comprising means for writing an UNDO-log entry on a first update of the current value of the NVM-based variable in the GPR.

Example 76 includes the subject matter of Example 75, comprising means for writing the UNDO-log entry to a NVM-based buffer.

Example 77 includes the subject matter of Example 76, comprising means for allocating the size of the NVM-based buffer.

Example 78 includes the subject matter of Example 75, comprising means for flushing the UNDO-log entry on the first update of the current value of the NVM-based variable in the GPR.

Example 79 includes the subject matter of Example 67, comprising non-temporally writing an UNDO-log entry on a first update of the current value of the NVM-based variable in the GPR.

Example 80 includes the subject matter of Example 67, comprising means for storing an updated value of the NVM-based variable in the GPR to maintain the current value of the NVM-based variable in the GPR.

Example 81 includes the subject matter of Example 80, comprising means for storing the updated value of the NVM-based variable in the GPR without a write of the updated value to the NVM memory space address associated with the NVM-based variable prior to detection of the end of the atomic persistence region in the source code.

Example 82 includes the subject matter of Example 67, comprising means for executing an SFENCE instruction based on detection of the end of the atomic persistence region in the source code.

Example 83 includes the subject matter of Example 82, the SFENCE instruction to ensure any stores made before the SFENCE instruction are globally visible prior to any stores made after the SFENCE instruction.

Example 84 includes the subject matter of Example 83, comprising means for streaming or write-back-flushing the current value of the NVM-based variable in the GPR to the NVM memory space address associated with the NVM-based variable to store the current value of the NVM-based variable to the NVM memory space address associated with the NVM-based variable in response to execution of the SFENCE instruction.

Example 85 includes the subject matter of Example 84, comprising means for flushing the current value of the NVM-based variable from one or more caches in response to execution of the SFENCE instruction.

Example 86 includes the subject matter of Example 84, comprising means for executing a second SFENCE instruction after the current value of the NVM-based variable in the GPR is streamed or write-back-flushed to the memory address space associated with the NVM.

Example 87 includes the subject matter of Example 86, comprising means for pruning an UNDO-log to an empty state after execution of the second SFENCE instruction.

Example 88 includes the subject matter of Example 86, comprising means for pruning the GPR to an empty state after execution of the second SFENCE instruction.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. An apparatus, the apparatus comprising:
   memory; and
   logic, at least a portion of the logic implemented in circuitry coupled to the memory, the logic to:
      detect a start of an atomic persistence region in a source code;
      identify a nonvolatile memory (NVM) based variable in the atomic persistence region of the source code;
      allocate a general purpose register (GPR) to the NVM-based variable;
      maintain a current value of the NVM-based variable in the GPR;
      detect an end of the atomic persistence region in the source code; and
      store the current value of the NVM-based variable in the GPR to a NVM memory space address associated with the NVM-based variable in response to detection of the end of the atomic persistence region.

2. The apparatus of claim 1, wherein the GPR is backed by a volatile stack, and the volatile stack is for holding the NVM-based variable.

3. The apparatus of claim 1, wherein the GPR comprises at least one elastic volatile register file.

4. The apparatus of claim 1, wherein the GPR includes a virtual GPR, and the logic is to schedule the virtual GPR over one or more hardware GPRs.

5. The apparatus of claim 1, wherein the NVM-based variable includes a variable with a physical memory address in NVM at run-time.

6. The apparatus of claim 1, wherein the logic is to store an updated value of the NVM-based variable in the GPR to maintain the current value of the NVM-based variable in the GPR.

7. The apparatus of claim 1, wherein the logic is to reset an UNDO-log pointer in response to detection of the start of the atomic persistence region in the source code.

8. The apparatus of claim 1, wherein the logic is to write an UNDO-log entry on a first update of the current value of the NVM-based variable in the GPR.

9. The apparatus of claim 8, wherein the logic is to write the UNDO-log entry to a NVM-based buffer.

10. The apparatus of claim 9, wherein the logic is to allocate the size of the NVM-based buffer.

11. At least one non-transitory computer-readable medium comprising a set of instructions that, in response to being executed by a processor circuit, cause the processor circuit to:
   detect a start of an atomic persistence region in a source code;
   identify a nonvolatile memory (NVM) based variable in the atomic persistence region of the source code;
   allocate a general purpose register (GPR) to the NVM-based variable;
   maintain a current value of the NVM-based variable in the GPR;
   detect an end of the atomic persistence region in the source code; and
   store the current value of the NVM-based variable in the GPR to a NVM memory space address associated with the NVM-based variable in response to detection of the end of the atomic persistence region.

12. The at least one non-transitory computer-readable medium of claim 11, wherein the GPR is backed by a volatile stack, and the volatile stack is for holding the NVM-based variable.

13. The at least one non-transitory computer-readable medium of claim 11, wherein the GPR comprises at least one elastic volatile register file.

14. The at least one non-transitory computer-readable medium of claim 11, wherein the GPR includes a virtual GPR, and comprising instructions that, in response to being executed by the processor circuit, cause the processor circuit to schedule the virtual GPR over one or more hardware GPRs.

15. A computer-implemented method, comprising:
detecting a start of an atomic persistence region in a source code;
identifying a nonvolatile memory (NVM) based variable in the atomic persistence region of the source code;
allocating a general purpose register (GPR) to the NVM-based variable;
maintaining a current value of the NVM-based variable in the GPR;
detecting an end of the atomic persistence region in the source code; and
storing the current value of the NVM-based variable in the GPR to a NVM memory space address associated with the NVM-based variable in response to detection of the end of the atomic persistence region.

16. The computer-implemented method of claim 15, comprising non-temporally writing an UNDO-log entry on a first update of the current value of the NVM-based variable in the GPR.

17. The computer-implemented method of claim 15, comprising storing an updated value of the NVM-based variable in the GPR to maintain the current value of the NVM-based variable in the GPR.

18. The computer-implemented method of claim 17, comprising storing the updated value of the NVM-based variable in the GPR without a write of the updated value to the NVM memory space address associated with the NVM-based variable prior to detection of the end of the atomic persistence region in the source code.

19. The computer-implemented method of claim 15, comprising executing an SFENCE instruction in response to detection of the end of the atomic persistence region in the source code.

20. The computer-implemented method of claim 19, the SFENCE instruction to ensure any stores made before the SFENCE instruction are globally visible prior to any stores made after the SFENCE instruction.

21. The computer-implemented method of claim 20, comprising streaming or write-back-flushing the current value of the NVM-based variable in the GPR to the NVM memory space address associated with the NVM-based variable to store the current value of the NVM-based variable to the NVM memory space address associated with the NVM-based variable in response to execution of the SFENCE instruction.

22. The computer-implemented method of claim 21, comprising flushing the current value of the NVM-based variable from one or more caches in response to execution of the SFENCE instruction.

23. The computer-implemented method of claim 21, comprising executing a second SFENCE instruction after the current value of the NVM-based variable in the GPR is streamed or write-back-flushed to the memory address space associated with the NVM.

24. The computer-implemented method of claim 23, comprising pruning an UNDO-log to an empty state after execution of the second SFENCE instruction.

25. The computer-implemented method of claim 23, comprising pruning the GPR to an empty state after execution of the second SFENCE instruction.

* * * * *